United States Patent
Hauke et al.

(10) Patent No.: US 9,396,360 B2
(45) Date of Patent: Jul. 19, 2016

(54) SYSTEM AND METHOD FOR SECURE CONTROL OVER PERFORMANCE STATE

(71) Applicant: ADVANCED MICRO DEVICES, INC., Sunnyvale, CA (US)

(72) Inventors: Jonathan Hauke, Lexington, MA (US); Benjamin Tsien, Fremont, CA (US); Denis Rystsov, San Francisco, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 169 days.

(21) Appl. No.: 13/928,930

(22) Filed: Jun. 27, 2013

(65) Prior Publication Data
US 2015/0007356 A1    Jan. 1, 2015

(51) Int. Cl.
G06F 3/00    (2006.01)
G06F 21/81    (2013.01)

(52) U.S. Cl.
CPC ...................................... G06F 21/81 (2013.01)

(58) Field of Classification Search
USPC ................. 726/36, 1; 713/190, 300, 320, 322
See application file for complete search history.

(56) References Cited

U.S. PATENT DOCUMENTS

| | | | | |
|---|---|---|---|---|
| 6,567,931 B1* | 5/2003 | Jue | ............................ | G06F 1/30 713/310 |
| 6,986,052 B1* | 1/2006 | Mittal | .................. | G06F 12/1441 711/E12.097 |
| 7,269,750 B1* | 9/2007 | Garritsen | .............. | G06F 1/3203 713/320 |
| 7,802,073 B1* | 9/2010 | Cheng | ................... | G06F 9/3851 712/10 |
| 2004/0181699 A1* | 9/2004 | Katoh | ........................ | G06F 1/26 713/300 |
| 2006/0053475 A1* | 3/2006 | Bezilla | .................. | G06F 21/552 726/1 |
| 2011/0078478 A1* | 3/2011 | Branover | .............. | G06F 1/3203 713/323 |
| 2012/0079290 A1* | 3/2012 | Kumar | ....................... | G06F 1/26 713/300 |
| 2013/0111191 A1* | 5/2013 | Murray | ................... | G06F 9/384 712/214 |
| 2014/0149769 A1* | 5/2014 | Brock | ................... | G06F 1/3237 713/322 |
| 2014/0173297 A1* | 6/2014 | Varma | ..................... | G06F 1/324 713/300 |
| 2014/0189392 A1* | 7/2014 | Bodio | ................... | G06F 1/3203 713/320 |
| 2014/0189776 A1* | 7/2014 | Diehl | ...................... | H04L 63/20 726/1 |
| 2014/0229750 A1* | 8/2014 | Bhandaru | ............. | G06F 9/5094 713/320 |
| 2014/0281445 A1* | 9/2014 | Varma | ..................... | G06F 1/206 713/1 |
| 2014/0310539 A1* | 10/2014 | Messick | .................. | G06F 1/263 713/320 |

* cited by examiner

*Primary Examiner* — Joseph P Hirl
*Assistant Examiner* — Sayed Beheshti Shirazi
(74) *Attorney, Agent, or Firm* — Faegre Baker Daniels LLP

(57) ABSTRACT

The present disclosure relates to a method and system for securing a performance state change of one or more processors. A disclosed method includes intercepting a request for a change of a performance state of the processor and determining whether to execute the request based on a security condition of the processor. The performance state of the processor includes at least one of an operating voltage and an operating frequency. A disclosed system includes an operating system module operative to transmit a request for a performance state change of at least one processing core. The system includes performance state control logic in communication with the operating system module and operative to receive the request and to change the performance state of the at least one processing core based on the request. The computing system further includes performance state security logic operative to intercept the request transmitted from the operating system module to the performance state control logic and to selectively transmit the request to the performance state control logic based on a security condition of the computing system.

34 Claims, 4 Drawing Sheets

US 9,396,360 B2

SYSTEM AND METHOD FOR SECURE CONTROL OVER PERFORMANCE STATE

FIELD OF THE DISCLOSURE

The present disclosure is generally related to processor security, and more particularly to methods and systems for securing a performance state of at least one processor.

BACKGROUND

A processing node or core in a computing system may be placed in any of multiple performance states (also referred to as power states or operational states) during operation, where the particular performance state (P state) is characterized by an associated operating voltage and operating frequency. Typically, the decision to transition the processing node between performance states is made by the operating system (OS). Other high-level control software or a hardware controller such as a bridge circuit (e.g., northbridge) may also initiate a change in the performance state. One exemplary factor for determining the appropriate performance state of a processing node is the processor's utilization. Utilization is the ratio of the time spent by one or more processing nodes in the active (execution) state to the overall time interval over which the execution time was tracked or measured. A higher node utilization may trigger the selection of a higher operating voltage and/or frequency to better address performance/watt requirements. For example, if the processing node running at a low performance state results in longer code execution time, the system perceives the need for a higher utilization and changes the processing node to a higher performance state suitable for faster code execution. Other suitable factors may cause the system to change performance states, such as the number of chip components running, the number or type of programs running, power saving needs, and/or performance needs, for example.

FIG. 1 illustrates an exemplary known computing system 10 including a computer processor 50. Processor 50, which may include one or more processing devices, includes microcode 18, a bridge circuit 14, voltage/clock regulators 20, and one or more processing cores (nodes) 16. An operating system module 12 is in communication with processor 50. Processor 50 may include a central processing unit (CPU), a graphics processing unit (GPU), an accelerated processing unit (APU), and/or any other suitable processor or processing device. Processor 50 may be a single chip device, such as a system on a chip (SOC), or multiple physical devices. Computing system 10 includes a display 34 operatively coupled to processor 50 and operative to display data processed at least in part by processing cores 16. An exemplary computing system 10 includes a laptop, desktop, gaming system, mobile device (e.g., tablet, smartphone, etc.), multimedia player, electronic book (e-books), or any other suitable computing system or device.

Microcode 18 interfaces with operating system module 14 to control processing cores 16. Microcode 18 receives instructions or sequences from operating system module 12 and outputs instructions/sequences to bridge circuit 14 for controlling cores 16. For example, microcode 18 provides signals to bridge circuit 14 for controlling the P state of processing cores 16 based on instructions from operating system module 12. Bridge circuit 14 manages communication between components of computing system 10, including between microcode 18 and voltage/clock regulators 20. Bridge circuit 14 includes P state control logic 24 for controlling the P state of processing cores 16 based on instructions from microcode 18. P state control logic 24 of bridge circuit 14 may control or limit the P state based on the operating temperature of one or more processor components provided with a temperature sensor 26.

Operating system module 12 (or P state control logic 124) may determine that a P state of processing cores 16 should change from one level to another based, for example, on usage or utilization of the cores 16. Operating system module 12 generates a P state change request 22 and transmits the request 22 to microcode 18. The P state change request 22 identifies a target performance state, which includes a target operating voltage and a target operating frequency of the cores 16. Microcode 18 sends the P state change request 22 to bridge circuit 14 for servicing. Microcode 18 may adjust the request 22, for example, by delaying transmission of the request 22 to bridge circuit 14 or by transmitting the request 22 according to a delivery sequence.

Microcode 18 writes the request 22 to a storage register 26 of bridge circuit 14 accessible by P state control logic 24. P state control logic 24 issues a voltage and frequency request 30 to regulators 20 (voltage regulator 40 and clock regulator 42, respectively) corresponding to the P state identified with request 22. The voltage and frequency request 30 specifies the target operating voltage and operating frequency of processing cores 16 that was identified in the request 22 (or the target operating voltage/frequency as modified by microcode 18 and/or P state control logic 24 based on chip limits 28 or temperature limits). Voltage/clock regulators 20 execute the voltage/frequency request 30 by sending corresponding voltage/frequency signals to the respective power rail and clock rail of processing cores 16.

P state limits 28 associated with processor 50 are stored in memory of bridge circuit 14 (or other processor memory). P state limits 28 may include a minimum/maximum operating voltage and/or a minimum/maximum operating frequency of the processing cores 16. Microcode 18 is operative to check the P state change request 22 against the P state limits 28 prior to forwarding request 22. P state control logic 24 may also limit the operating voltage and/or frequency of processing cores 16 if the temperature of the chip exceeds a threshold.

If computing system 10 is hacked or otherwise accessed without authorization, the hacker may attempt to cause processor 50 (or subsystems of processor 50) to enter into an improper performance state or to execute a P state change request for improper operating voltage and/or frequency levels of processing cores 16. Such improper operating voltages and frequencies may create security vulnerabilities in computing system 10. In addition, if a change in an operating voltage and/or frequency occurs in an undesired manner, there may be a potential that either the processing cores 16 or other subsystems are put in a state that allows the readout of data from registers and memory locations. For example, a hacker may attempt to glitch (e.g., short-term fault) the operating voltage in a predictable way to cause the processor 50 to incorrectly branch or load data or perform other illegal or improper operations.

Therefore, a need exists for methods and systems for securing control over the performance state of a processor, such as over a performance state change of the processor, to reduce the likelihood of security breaches. Further, a need exists for methods and systems to detect and block unauthorized access of performance state control.

SUMMARY OF EMBODIMENTS OF THE DISCLOSURE

In an exemplary embodiment of the present disclosure, a method of securing a performance state change of a processor is provided. The method includes intercepting, by performance state security logic, a request for a change of a performance state of the processor. The performance state includes at least one of an operating voltage and an operating frequency. The method further includes determining, by the performance state security logic, whether to execute the request based on a security condition of the processor.

Among other advantages in certain embodiments, the method and system of the present disclosure provide improved security over a change of the performance state of one or more processors. In some embodiments, P state change requests are intercepted and analyzed with respect to processor security. In some embodiments, by routing the P state change request over a secure path and blocking transmission of the P state change request over unsecure paths, the likelihood of a security breach with a P state change is reduced. In some embodiments, system security is improved by blocking direct operating system-based control over P state and by routing P state change requests through a security processor. Other advantages will be recognized by those of ordinary skill in the art.

In one example, the intercepting includes blocking a transmission of the request for the change of the performance state over a first communication path and routing the request for the change of the performance state over a second communication path different from the first communication path. In another example, the first communication path and the second communication path are routed from an operating system module to a bridge circuit of the processor, and the bridge circuit includes performance state control logic configured to receive the request from the operating system module over at least one of the first and second communication paths and to change the performance state of the processor based on the request. In yet another example, the method includes analyzing the security condition by comparing a target performance state identified with the request with a plurality of predefined performance states, and the method further includes initiating an execution of the request in response to the target performance state matching at least one of the predefined performance states. In still another example, the method further includes changing the performance state of the processor based on the request in response to determining that the processor is in a secure condition. In another example, the method further includes at least one of denying the execution of and modifying the request for the change of the performance state in response to determining that the processor is in an unsecure condition.

In another exemplary embodiment of the present disclosure, a method of securing a performance state change of a processor is provided. The method includes blocking a request for a change of a performance state of the processor transmitted over a first communication path of the processor. The performance state includes at least one of an operating voltage and an operating frequency. The method further includes routing the request for the change of the performance state over a second communication path of the processor different from the first communication path. The second communication path includes performance state security logic operative to selectively allow execution of the request.

In yet another exemplary embodiment of the present disclosure, a non-transitory computer-readable medium includes executable instructions such that when executed by at least one processor cause the at least one processor to intercept a request for a change of a performance state of the at least one processor and to determine whether to execute the request based on a security condition of the at least one processor. The performance state includes at least one of an operating voltage and an operating frequency.

In still another exemplary embodiment of the present disclosure, an integrated circuit is provided including at least one processor having at least one processing core. The at least one processor further includes performance state security logic operative to intercept a request for a change of a performance state of the at least one processing core and to determine whether to execute the request based on a security condition of the at least one processor. The performance state includes at least one of an operating voltage and an operating frequency.

In another exemplary embodiment of the present disclosure, a computing system is provided including an operating system module, performance state control logic in communication with the operating system module, and performance state security logic. The operating system module is operative to transmit a request for a change of a performance state of at least one processing core of the computing system. The performance state control logic is operative to receive the request and to change the performance state of the at least one processing core based on the request. The performance state security logic is operative to intercept the request transmitted from the operating system module to the performance state control logic and to selectively transmit the request to the performance state control logic based on a security condition of the computing system.

BRIEF DESCRIPTION OF THE DRAWINGS

The embodiments will be more readily understood in view of the following description when accompanied by the below figures and wherein like reference numerals represent like elements.

DETAILED DESCRIPTION

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terminology "circuit" and "circuitry" refers generally to hardwired logic that may be implemented using various discrete components such as, but not limited to, diodes, bipolar junction transistors (BJTs), field effect transistors (FETs), etc., which may be implemented on an integrated circuit using any of various technologies as appropriate, such as, but not limited to CMOS, NMOS, etc.

Figure 1:
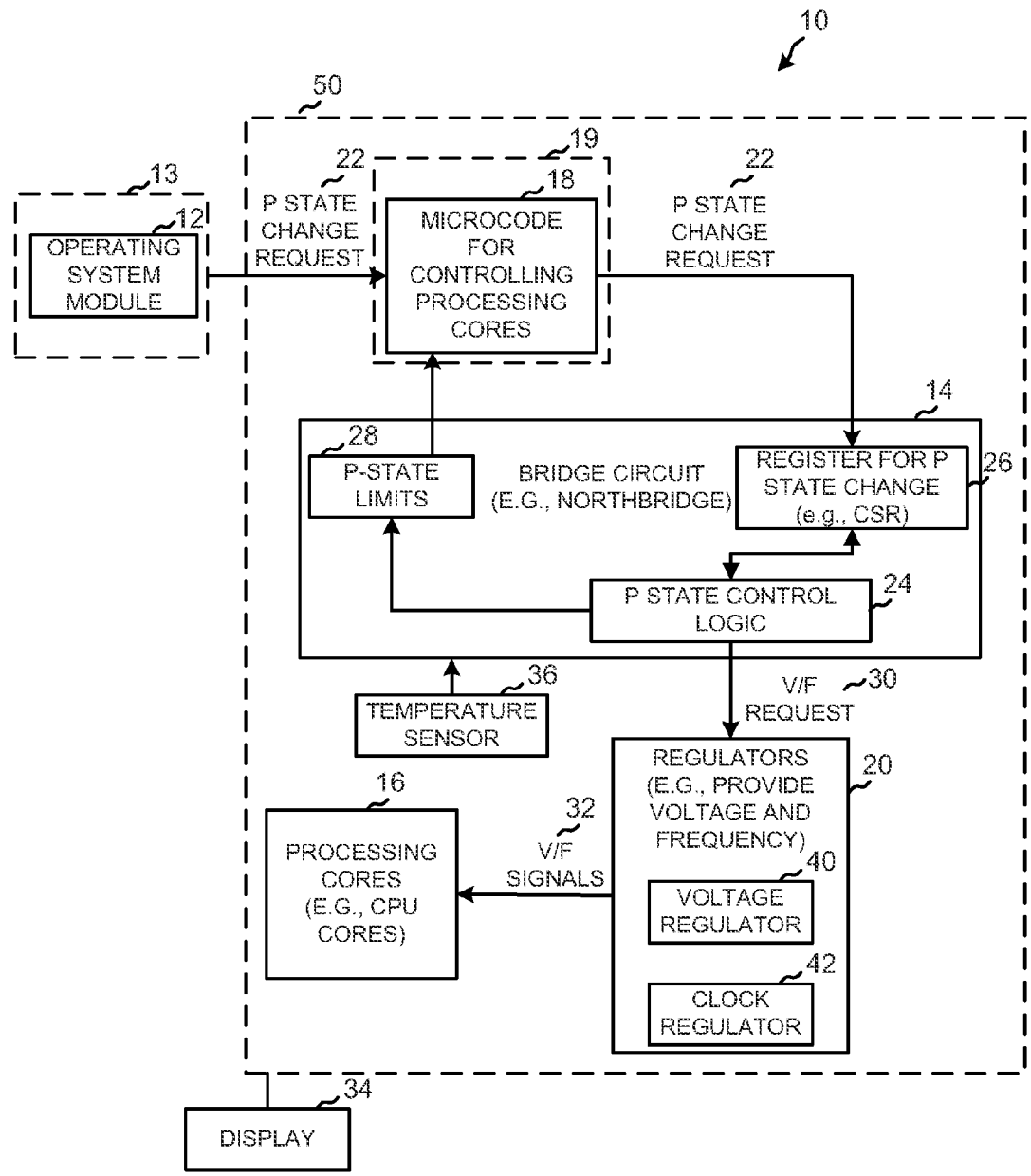
FIG. 1 is a block diagram of a prior known computing system including an operating system module, microcode, a bridge circuit, and one or more processing cores.
Figure 2:
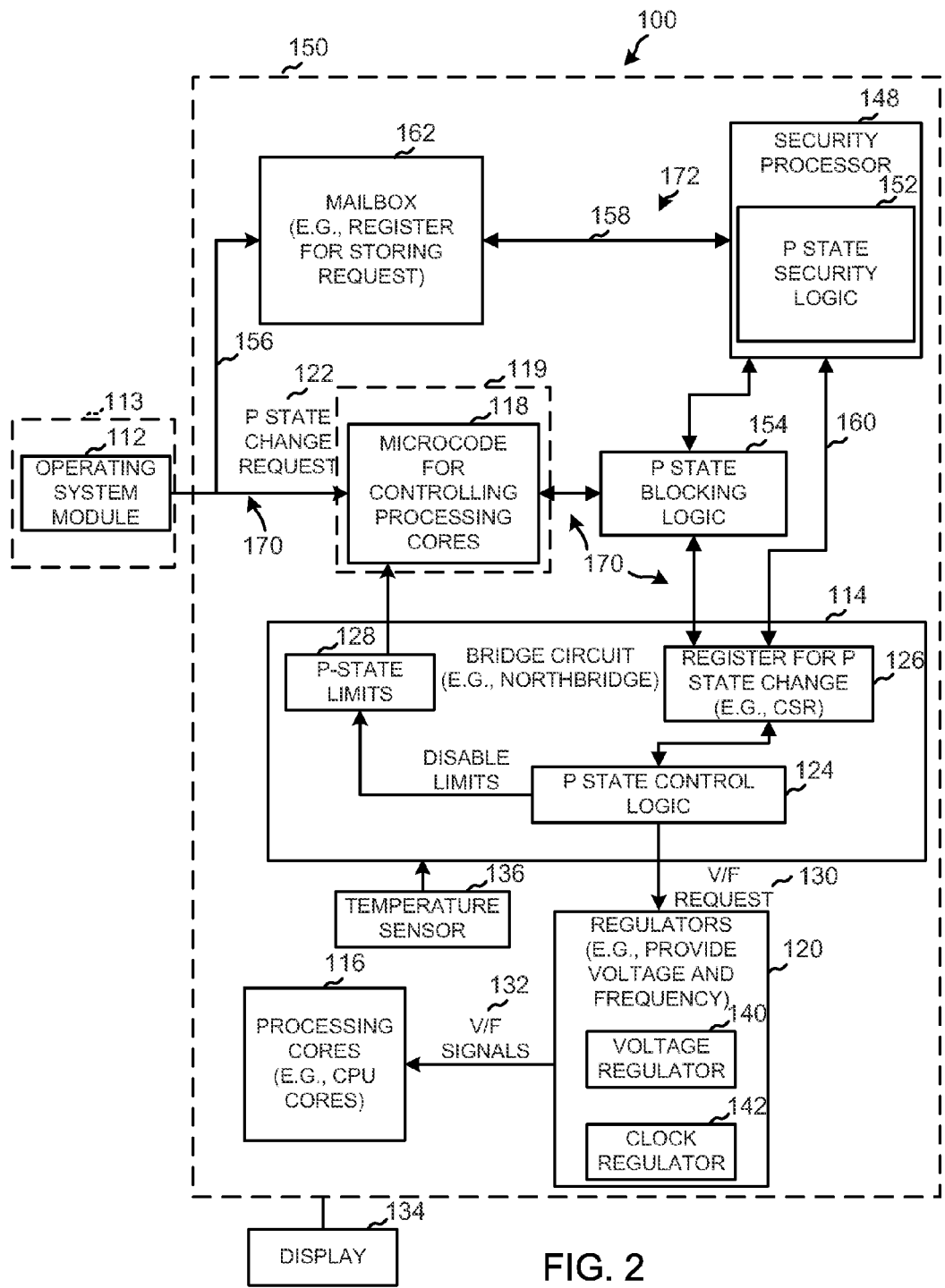
FIG. 2 is a block diagram of a computing system in accordance with some embodiments including a security processor with performance state security logic in communication with performance state blocking logic.

FIG. 2 illustrates an exemplary computing system 100 according to various embodiments that is configured to provide secure control over the performance state (P state) of a processor 150. Computing system 100 may be viewed as modifying the known computing system 10 described in FIG. 1. For example, processor 150 of computing system 100 further includes a security processor 148, a mailbox (storage register) 162, and P state blocking logic 154 in communication with microcode 118, bridge circuit 114, and security processor 148. Like components of system 10 of FIG. 1 and system 100 of FIG. 2 are provided with like reference numbers (e.g., bridge circuit 14 of FIG. 1 and bridge circuit 114 of FIG. 2). Various other arrangements of internal and external components and corresponding connectivity of computing system 100, that are alternatives to what is illustrated in the figures, may be utilized and such arrangements of internal and external components and corresponding connectivity would remain in accordance with the embodiments herein disclosed.

In one embodiment, some or all components of processor 150 are provided as an integrated circuit on a single chip device. For example, processor 150 may include a system on a chip (SOC). In one embodiment, processing cores 116, bridge circuit 114, memory 119 containing microcode 118, mailbox (e.g., storage register) 162, security processor 148, and P state blocking logic 154 are provided on a single chip device. In the illustrated embodiment, memory 113 containing operating system module 112 is physically separate from and in communication with processor 150, although operating system module 112 may alternatively be included with processor 150. In one embodiment, the voltage regulator 140 is off-chip, and the clock regulator 142 is on-chip, although both regulators 120 may be provided on-chip. Alternatively, one or more components of processor 150 may be provided on separate physical devices or chips and interfaced with on-chip components via communication paths. In one embodiment, a display 134, which is operative to display data processed at least in part by processing core(s) 116, is externally connected to and in communication with processor 150. In one embodiment, processor 150 includes a central processing unit (CPU), a graphical processing unit (GPU), and/or an accelerated processing unit (APU). Processing cores 116 may be used for any suitable processing tasks, such as general-purpose computations and/or graphical computations (e.g., pixel output for display on display 134), for example. In one embodiment, processing cores 116 are CPU processing cores operative to provide overarching control and command of computing system 100. Other suitable configurations of computing system 100 may be provided.

Memory 113 and memory 119 may be physically separate memory or the same physical memory. Exemplary memory 113, 119 includes read-only memory (ROM), random access memory (RAM), hard disk storage, flash memory, or other suitable on-chip or off-chip memory types, accessible by processing cores 116. Operating system module 112 includes software and/or firmware stored in memory 113 and executed by at least one processing core 116 for managing operation of computing system 100. Operating system module 112 is operative, for example, to manage task allocation, memory/processor usage, and hardware resources of computing system 100 and to manage the execution of one or more applications or programs stored in memory of computing system 100. Microcode 118, which interfaces with operating system module 112 to control processing cores 116, includes software and/or firmware stored in memory 119 and executed by at least one processing core 116.

An exemplary operating system module 112 includes Microsoft Windows, Mac OS, Linux, or other suitable operating systems for managing the overall operation of computing system 100. Operating system module 112 is operative to initiate a P state change request 122 for changing a performance state of one or more subsystems of processor 150, such as processing cores 116, for example. Operating system module 112 may transmit the P state change request 122 to microcode 118. Alternatively, operating system module 112 may write request 122 to a register, and microcode 118 retrieves the request 122 from the register. Other suitable control software and/or hardware may initiate the request 122 for the P state change. In some embodiments, microcode 118 and/or P state control logic 124 of bridge circuit 114 may initiate and/or modify the P state change request 122. While the P state change request 122 is described herein as being used to change the P state of one or more processing cores 116, the P state change request 122 may be used to change the P state of other suitable subsystems of processor 150.

Bridge circuit 114 includes P state control logic 124 for controlling the P state of processing cores 116 based on one or more inputs, such as a P state change request 122 stored in a storage register 126, processor temperature data from temperature sensor 136, and P state limits 128, for example. An exemplary bridge circuit 114 is a northbridge circuit, although bridge circuit 114 may include a southbridge circuit or any other suitable bridge circuit for managing on- or off-chip communications. In one embodiment, bridge circuit 114 is further operative to retrieve data from memory that is used by cores 116 and to provide power requests to regulators 120 for controlling the power at cores 116 and/or other subsystems. Storage register 126 (e.g., a control/status register CSR) is operative to store data accessed or generated by P state control logic 124, such as a P state change request 122 routed from microcode 118 and/or security processor 148.

Security processor 148 may include any suitable processing device(s), such as a general-purpose processor or other suitable processor, for managing processor security. Security processor 148 is illustratively in communication with at least P state blocking logic 154, mailbox 162, and bridge circuit 114 of computing system 100. Security processor 148 includes P state security logic 152 operative to perform P state security functions described herein. P state security logic 152 includes software and/or firmware stored in memory executed by security processor 148. Security processor 148 may include other suitable security logic for providing other security related functions for computing system 100.

Mailbox 162 includes one or more storage registers or other suitable memory for storing P state change requests 122. For example, in one embodiment, the P state change request 122 from operating system module 112 is routed to both microcode 118 and to mailbox 162. In one or more operating modes, P state security logic 152 is operative to retrieve the P state change requests 122 from mailbox 162, such as, for example, upon detecting a status flag at mailbox 162 indicating a request 122 has been received from operating system module 112. Mailbox 162 may store other suitable data accessed by security processor 148 for controlling processor security. As such, mailbox 162 provides a mailbox message protocol for communication between operating system module 112 and security processor 148.

P state blocking logic 154 is operative to block or unblock the transmission of P state change requests 122 over a first communication path 170 based on instruction from P state security logic 152. In the illustrated embodiment, P state security logic 152 is operative to control P state blocking logic 154 to block transmission of P state requests routed from microcode 118 to bridge circuit 114 when computing system 100 is in a secure mode. Alternatively, blocking logic 154 may be configured to block the transmission of P state change request 122 at other locations along path 170, such as from operating system module 112 to microcode 118. In one embodiment, P state blocking logic 154 functions as an AND gate to selectively block transmission of P state change request 122 along first communication path 170 based on output from P state security logic 152. P state blocking logic 154 includes software and/or firmware stored in memory executed by security processor 148, although P state blocking logic 154 may alternatively be executed by processing cores 116. P state blocking logic 154 is illustratively shown external to security processor 148 but may alternatively be internal to security processor 148. In one exemplary embodiment, security processor 148, P state blocking logic 154, and mailbox 162 are provided on-chip with microcode 118, bridge circuit 114, and processing cores 116, although one or more of these components may alternatively be separate physical components.

In the illustrated embodiment, first communication path 170 is routed from operating system module 112 to microcode 118 to register 126 of bridge circuit 114. A second communication path 172 includes respective communication paths 156, 158, and 160 routed from operating system 112 to mailbox 162 to security processor 148 to register 126 of bridge circuit 114, thereby bypassing microcode 118.

Figure 5:
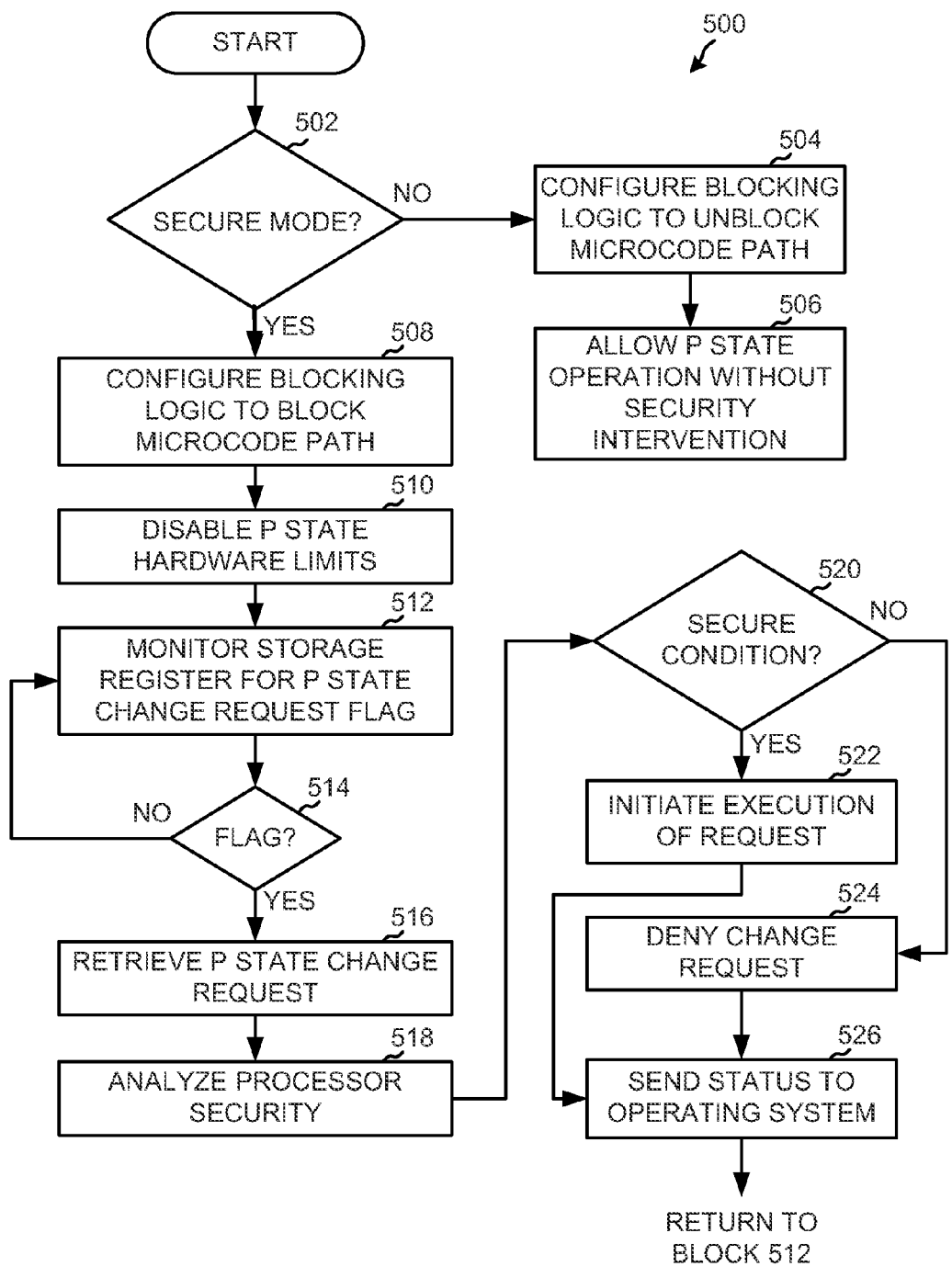
FIG. 5 is a flow chart of an exemplary detailed method of operation of the processor of FIG. 2 for securing a performance state change, according to some embodiments.

In one embodiment, computing system 100 is configured to operate in at least two different modes including a first (e.g., test or debug or diagnostics) mode and a second, secure mode, as described further in FIG. 5. In the first mode, P state security logic 152 instructs P state blocking logic 154 to allow transmission of P state change requests 122 over first communication path 170, and P state changes are executed by processor 150 similarly to the execution of P state changes by processor 50 described in FIG. 1. In particular, the P state change request 122 generated by operating system module 112 is routed over communication path 170 to register 126 of bridge circuit 114 for execution by P state control logic 124 and regulators 120. In the second, secure mode, P state security logic 152 instructs P state blocking logic 154 to block transmission of P state change requests 122 over the first communication path 170. As such, the P state change requests 122 are routed over second communication path 172, and P state security logic 152 allows or denies execution of the requests 122 based on processor security, as described herein.

In both the first and second modes, each request 122 is routed to storage register 126 of bridge circuit 114, and P state control logic 124 triggers a P state change upon detecting the request 122 in register 126. In particular, P state control logic 124 accesses the request 122 from storage register 126. P state control logic 24 issues a voltage and frequency request 30 to voltage/clock regulators 120 corresponding to the P state identified with request 122. The voltage and frequency request 130 specifies the target operating voltage and operating frequency of processing cores 116 that was identified in the request 122 (or the target operating voltage/frequency as modified by microcode 118 and/or P state control logic 124 based on chip limits 128 or temperature limits). Voltage/clock regulators 120 execute the voltage/frequency request 130 by sending respective voltage/frequency signals to the respective power rail and clock rail of processing cores 116. Voltage regulator 140 receives power from any suitable power source coupled to processor 150, such as battery power or building power, for example. In one embodiment, clock regulator 142 is a digital frequency synthesizer for generating an operating frequency of processing cores 116.

In the illustrated embodiment, operating system module 112 generates the request 122 in both the first and second operating modes. The request 122 may be based on processor utilization, as described herein. In one embodiment, microcode 118 is also operative to initiate a P state change request 122, such as based on P-state limits 128 and/or a chip operating temperature exceeding predetermined limits. For example, P state control logic 124 is operative to monitor the operating temperature of processing cores 116 or other chip subsystems based on a signal indicative of the operating temperature provided with temperature sensor 136. If the temperature exceeds a stored limit, P state control logic 124 is operative to reduce the operating frequency or voltage of processing cores 116.

In one embodiment, microcode 118 and/or P state control logic 124 are also configured to check each P state change request 122 against predetermined P state limits 128 to determine if a particular P state identified in a request 122 can be carried out without violating the limits 128. P state limits 128 may include a minimum/maximum operating voltage and/or a minimum/maximum operating frequency of the processing cores 116. P state limits 128 may be based on thermal or performance constraints of processor 150 or other chip constraints. In one embodiment, P state limits 128 include a delta limit wherein the delta (i.e., change) of the voltage and/or frequency between the current P state and the requested P state may not exceed a particular value. In this embodiment, microcode 118 and/or P state control logic 124 may limit the target operating voltage/frequency such that the change in the voltage/frequency does not exceed the specified delta limits. In one embodiment, P state security logic 152 disables one or more P state limits 128 in the secure mode of operation.

Figure 3:
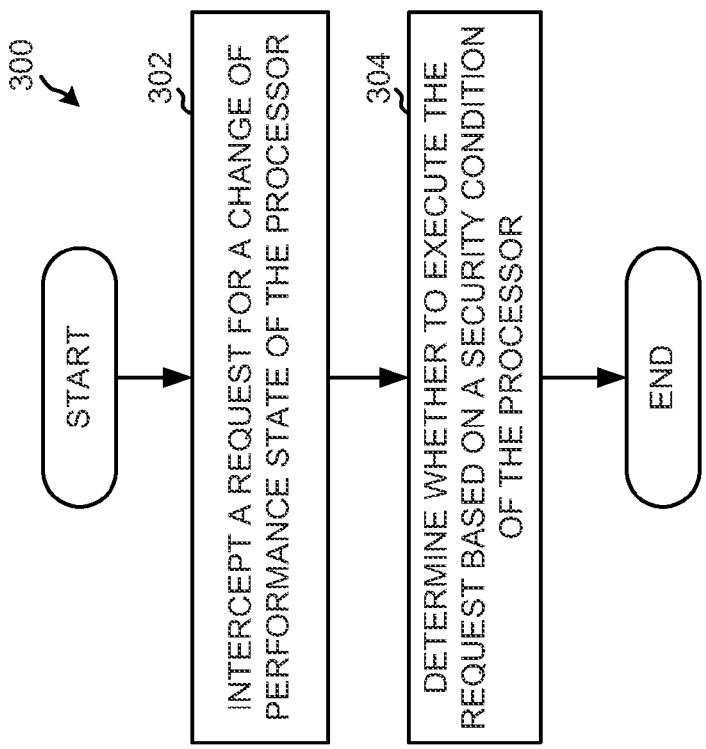
FIG. 3 is a flow chart of an exemplary method of operation of the performance state security logic of FIG. 2 for securing a performance state change, according to some embodiments.

FIG. 3 illustrates a flow diagram 300 of an exemplary operation performed by P state security logic 152 of security processor 148 of FIG. 2 for securing control over a P state change in a secure mode of operation. Reference is made to FIG. 2 throughout the description of FIG. 3. At block 302, P state security logic 152 intercepts a request 122 for a change of a performance state of processor 150. The performance state includes at least one of an operating voltage and an operating frequency of one or more subsystems of processor 150 (e.g., processing cores 116). For example, P state security logic 152 blocks the transmission of the P state change request 122 over first communication path 170 by instructing P state blocking logic 154 to block the request 122 sent from microcode 118 to bridge circuit 114. Further, P state security logic 152 routes P state change request 122 over second communication path 172 by retrieving the request from mailbox 162 and, after analyzing processor security, selectively transmitting the request 122 over path 160 to bridge circuit 114.

At block 304, P state security logic 152 determines whether to execute the request 122 retrieved from mailbox 162 based on a security condition of processor 150. In one embodiment, P state security logic 152 analyzes a security condition of processor 150 based on request 122. For example, P state security logic 152 compares the target performance state identified with request 122 with the predefined performance states stored in memory of processor 150. For example, a target P state that does not match a predefined P state may indicate that operating system module 112 or other processor components have been accessed or hacked to change the P state to improper levels. Each predefined performance state includes an operating voltage and an operating frequency at which processing cores 116 are configured to operate and/or at which operating system module 112 is configured to request. If the target operating voltage and/or target operating frequency identified with request 122 does not match the operating voltage/frequency of a predefined P state, P state security logic 152 determines that the processor 150 is in an unsecure condition due to the unrecognized target P state.

In one embodiment, each predefined P state has an associated range (or tolerance) of acceptable voltage levels and frequency levels associated with that P state. In this embodiment, the target P state of request 122 is determined to match a predefined P state when the target operating voltage and target operating frequency falls within the respective ranges of operating voltage levels and frequency levels of the predefined P state.

In response to determining that processor 150 is in the unsecure condition, P state security logic 152 denies execution of P state change request 122 by not forwarding the request to bridge circuit 114 for servicing. As such, processing cores 116 remain in the current P state. Alternatively, P state security logic 152 may modify the request 122 such that the target P state identified with request 122 matches a predefined P state (e.g., adjust the target operating voltage and/or frequency to a nearest voltage/frequency of a predefined P state), and logic 152 transmits the modified request 122 to bridge circuit 114 for servicing. In one embodiment, P state security logic 152 may implement other security functions in response to determining the unsecure condition, such as resetting or powering down the processor 150.

P state security logic 152 may determine that processor 150 is unsecure and deny execution of the P state change request 122 based on other factors. In one embodiment, P state security logic 152 may deny execution of request 122 (or modify the request 122) based on system constraints, such as known limits of operating voltage and/or frequency. For example, although in some embodiments the implementation of P state limits 128 by microcode 118 and P state control logic 24 is blocked in the secure mode, P state security logic 152 may access P state limits 128 and temperature data and deny execution of the request if the operating temperature and/or the target P state fall outside limits 128. Further, security processor 148 may monitor other security aspects of processor 150 not related to the P state, and deny execution of request 122 upon detecting any potential security breach of processor 150.

If P state security logic 152 determines that processor 150 is in a secure condition (e.g., based on the target P state of request 122 matching a predefined P state), P state security logic 152 forwards request 122 to storage register 126 of bridge circuit 114, and bridge circuit 114 implements the target P state identified in the request 122, as described herein. In one embodiment, P state security logic 152 sends confirmation back to operating system module 112 that the P state change request 122 was either denied or allowed.

Figure 4:
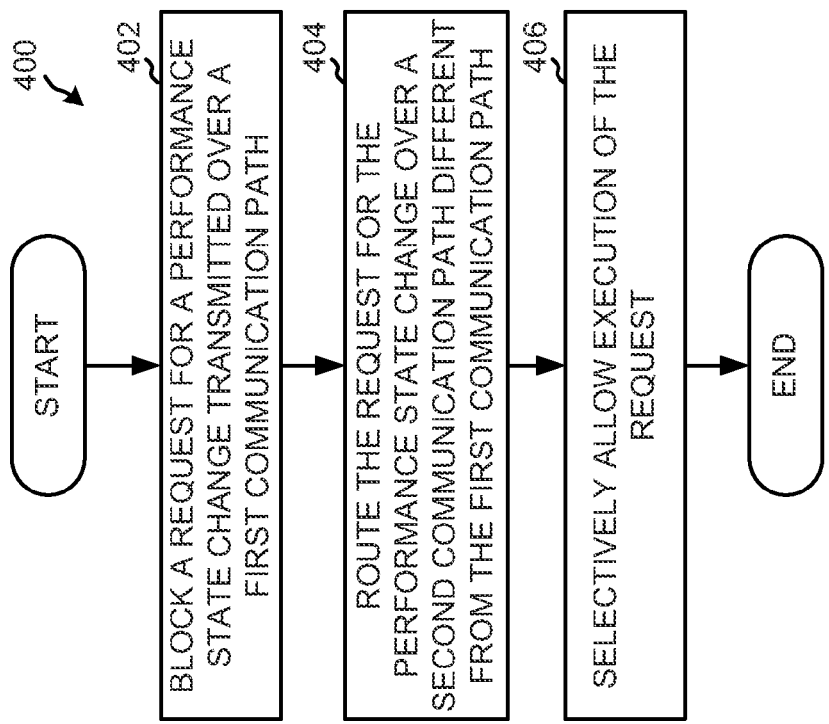
FIG. 4 is a flow chart of an exemplary method of operation of the processor of FIG. 2 for securing a performance state change, according to some embodiments.

FIG. 4 illustrates a flow diagram 400 of an exemplary operation performed by processor 150 of FIG. 2 for securing control over a P state change. Reference is made to FIG. 2 throughout the description of FIG. 4. At block 402, processor 150 blocks a request for a P state change transmitted over a first communication path 170. For example, P state security logic 152 configures or instructs P state blocking logic 154 to block transmission of a P state change request 122 from microcode 118 to bridge circuit 114, as described herein. At block 404, processor 150 routes the request 122 over a second communication path 172 different from first communication path 170, as described herein. Second communication path 172 includes P state security logic 152 operative to selectively allow execution of the request 122, such as based on processor security and/or system constraints, as described herein.

FIG. 5 illustrates a flow diagram 500 of an exemplary detailed method of operation of processor 150 of FIG. 2 for securing control over a P state change. Reference is made to FIG. 2 throughout the description of FIG. 5. At block 502, P state security logic 152 determines whether processor 150 is in a secure mode. Selection of the operating mode of processor 150 may be provided based on a configuration setting or via a user input to computing system 100, for example. If processor 150 is not in the secure mode, P state security logic 152 configures blocking logic 154 to unblock communication path 170 such that microcode 118 may transmit P state change requests 122 to bridge circuit 114, as represented at block 504. At block 506, P state operation over communication path 170 is allowed without intervention by security processor 148. In this mode, P state security logic 152 does not retrieve and/or execute P state change requests 122 sent to mailbox 162, or alternatively operating system module 112 does not send requests 122 to mailbox 162 in this mode. In one embodiment, the test or debug mode described herein is implemented at block 506.

If processor 150 is determined to be in the secure mode at block 502, P state security logic 152 configures blocking logic 154 to block communication path 170 at block 508 such that P state change requests 122 from microcode 118 cannot be transmitted to bridge circuit 114. Blocking logic 154 may include circuitry functioning as a logic gate (e.g., AND gate) or include other suitable circuitry configured to block requests 122 from reaching bridge circuit 114 over path 170. In alternative embodiments, blocking logic 154 blocks P state change requests 122 at other locations along path 170, such as between operating system module 112 and microcode 118. In other alternative embodiments, operating system module 112 and/or microcode 118 may be reprogrammed in the secure mode to transmit P state change requests 122 only over communication path 172 and not transmit over path 170.

At block 510, P state security logic 152 disables P state limits (e.g., limits 128 including temperature limits) that are implemented by microcode 118 and/or bridge circuit 114. As such, microcode 118 and P state control logic 124 of bridge circuit 114 are disabled from blocking or modifying the P state of processing cores 116 and the P state change requests 122 from P state security logic 152. In one embodiment, blocking logic 154 disables the P state limits 128 configured to be implemented by microcode 118 by blocking transmission of P state change requests that are based on P state limits 128. As such, P state control logic 124 has overarching control over the P state changes of processor 150. In another embodiment, block 510 is optional and one or more P state limits may not be disabled.

At block 512 and 514, P state security logic 152 monitors mailbox 162 for a flag (e.g., one or more bits changing state) indicating that a P state change request 122 has been received from operating system module 112 and stored at mailbox 162. Upon detection or receipt of the flag at block 514, P state security logic 152 retrieves the P state change request 122 from mailbox 162 at block 516. The P state change request 122 identifies a target performance state of processing cores 116 including a target operating voltage and target operating frequency, as described herein. At block 518, P state security logic 152 analyzes processor security to determine whether to allow or deny execution of the retrieved request 122, as described herein. If a secure condition is determined at block 520, P state security logic 152 initiates execution of request 122 at block 522 by transmitting the request 122 to register 126 of bridge circuit 114. P state control logic 124 of bridge circuit 114 implements the request 122 by sending a voltage/frequency request 130 to regulators 120, and regulators 120 adjust the performance state of processing cores 116 accordingly, as described herein. If P state security logic 152 determines at block 520 that processor 150 is in an unsecure condition, P state security logic 152 denies execution of the request 122 at block 524 by not transmitting the request 122 to bridge circuit 114.

Upon allowing or denying execution of the request 122 at blocks 522 and 524, P state security logic 152 sends a status to operating system module 112 (e.g., via mailbox 162) at block 526 indicating whether the request 122 was denied or allowed. In one embodiment, P state security logic 152 generates a code or other data indicating the reason for denying execution of the request 122, such as because the target P state did not match a predefined P state or because of other system constraints or security concerns. P state security logic 152 may notify operating system module 112 that a security breach may have occurred based on detection of an improper P state request 122. The process returns to block 512 to continue monitoring mailbox 162 for a P state change request flag.

The disclosed operations set forth herein may be carried out by one or more suitable processors that are in communication with non-transitory computer readable medium such as but not limited to CDROM, RAM, other forms of ROM, hard drives, distributed memory, etc. The non-transitory computer readable medium stores executable instructions that when executed by the one or more processors cause the one or more processors to perform, for example, the operations of P state security logic 152 and P state blocking logic 154 described herein and/or the methods as described with reference to FIGS. 3-5.

Among other advantages in certain embodiments, the method and system of the present disclosure provide improved security over a change of the performance state of one or more processors. In some embodiments, P state change requests are intercepted and analyzed with respect to processor security. In some embodiments, by routing the P state change request over a secure path and blocking transmission of the P state change request over unsecure paths, the likelihood of a security breach with a P state change is reduced. In some embodiments, system security is improved by blocking direct operating system-based control over P state and by routing P state change requests through a security processor. Other advantages will be recognized by those of ordinary skill in the art.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

What is claimed is:

1. A method of securing a performance state change of a processor, the method comprising:

intercepting, by performance state security logic, a request for a change of a performance state of the processor, the performance state including at least one of an operating voltage and an operating frequency, the intercepting comprising blocking a transmission of the request for the change of the performance state to be transmitted over a first communication path to a first destination and routing the request for the change of the performance state over a second communication path to the first destination different from the first communication path;

analyzing, by the performance state security logic, a security condition of the processor for an indication of an unauthorized access to the processor; and determining, by the performance state security logic, whether to execute the request based on the security condition of the processor.

2. The method of claim 1, wherein the first communication path and the second communication path are routed from an operating system module and the first destination is a bridge circuit of the processor, and the bridge circuit includes performance state control logic configured to receive the request from the operating system module over at least one of the first and second communication paths and to change the performance state of the processor based on the request.

3. The method of claim 1, wherein the second communication path includes a storage register for storing the request, and the performance state security logic accesses the request over the second communication path from the storage register.

4. The method of claim 1, further comprising analyzing the security condition of the processor based on the request for the change of the performance state.

5. The method of claim 4, wherein the analyzing the security condition comprises comparing a target performance state identified with the request with a plurality of predefined performance states, the method further comprising initiating an execution of the request in response to the target performance state matching at least one of the predefined performance states.

6. The method of claim 1, further comprising changing the performance state of the processor based on the request in response to determining that the processor is in a secure condition.

7. The method of claim 6, wherein the changing comprises
transmitting, by the performance state security logic, the request to performance state control logic of the processor,
transmitting, by the performance state control logic, at least one of a voltage request and a frequency request to at least one of a voltage regulator and a clock regulator, and
adjusting, by the at least one of the voltage regulator and the clock regulator, at least one of the operating voltage and the operating frequency of the processor based on the at least one of the voltage request and the frequency request.

8. The method of claim 1, further comprising at least one of denying the execution of and modifying the request for the change of the performance state in response to determining that the processor is in an unsecure condition, wherein the modifying the request comprises modifying at least one of a target operating voltage and a target operating frequency identified with the request.

9. The method of claim 1, wherein the processor includes memory containing microcode that when executed by the processor is operative to control at least one processing core of the processor based on instructions from an operating system module and to transmit the request to performance state control logic of the processor for changing the performance state of the at least one processing core, and the intercepting comprises blocking the request transmitted from the microcode to the performance state control logic.

10. The method of claim 9, wherein the request is generated by the operating system module, and the intercepting further comprises routing the request from the operating system module over a communication path that bypasses the microcode.

11. A method of securing a performance state change of a processor, the method comprising:

blocking a request for a change of a performance state of the processor from being transmitted over a first communication path of the processor to a first destination, the performance state including at least one of an operating voltage and an operating frequency; and routing the request for the change of the performance state over a second communication path of the processor to the first destination, the second communication path being different from the first communication path, the second communication path including performance state security logic operative to selectively allow execution of the request.

12. The method of claim 11, further comprising analyzing, by the performance state security logic, a security condition of the processor based on the request for the change of the performance state, the performance state security logic allowing execution of the request to change the performance state of the processor in response to determining that the processor is in a secure condition.

13. The method of claim 11, wherein the first communication path and the second communication path are routed from an operating system module to a bridge circuit of the processor, and the bridge circuit includes performance state control logic configured to receive the request from the operating system module over at least one of the first and second communication paths and to change the performance state of the processor based on the request.

14. A non-transitory computer-readable medium comprising:

executable instructions such that when executed by at least one processor cause the at least one processor to:

intercept a request for a change of a performance state of the at least one processor, the performance state including at least one of an operating voltage and an operating frequency, intercepting the request for the change of the performance state including blocking the request from being transmitted over a first communication path to a first destination and routing the request over a second communication path to the first destination, the second communication path being different from the first communication path;

analyze a security condition of the at least one processor for an indication of an unauthorized access to the at least one processor; and determine whether to execute the request based on the security condition of the at least one processor.

15. The non-transitory computer-readable medium of claim 14, wherein the first communication path and the second communication path are routed from an operating system module to a bridge circuit of the at least one processor, and the bridge circuit receives the request from the operating system module over at least one of the first and second communication paths and changes the performance state of the at least one processor based on the request.

16. The non-transitory computer-readable medium of claim 14, the executable instructions when executed by the at least one processor further causing the at least one processor to analyze the security condition of the at least one processor based on the request for the change of the performance state.

17. The non-transitory computer-readable medium of claim 16, wherein the at least one processor analyzes the security condition by comparing a target performance state identified with the request with a plurality of predefined performance states, the executable instructions further causing the at least one processor to initiate an execution of the request in response to the target performance state matching at least one of the predefined performance states.

18. The non-transitory computer-readable medium of claim 14, the executable instructions when executed by the at least one processor further causing the at least one processor to change the performance state of the at least one processor based on the request in response to a determination that the at least one processor is in a secure condition.

19. The non-transitory computer-readable medium of claim 14, the executable instructions when executed by the at least one processor further causing the at least one processor to at least one of deny the execution of and modify the request in response to a determination that the at least one processor is in an unsecure condition, wherein the at least one processor modifies the request by modifying at least one of a target operating voltage and a target operating frequency identified with the request.

20. An integrated circuit comprising:

at least one processor including at least one processing core, the at least one processor further including performance state security logic operative to intercept a request for a change of a performance state of the at least one processing core, the performance state including at least one of an operating voltage and an operating frequency, intercepting the request for the change of the performance state including blocking the request from being transmitted over a first communication path to a first destination and routing the request over a second communication path to the first destination, the second communication path being different from the first communication path;

analyze a security condition of the at least one processor for an indication of an unauthorized access to the at least one processor; and determine whether to execute the request based on the security condition of the at least one processor.

21. The integrated circuit of claim 20, wherein the first communication path and the second communication path are routed from an operating system module to a bridge circuit of the at least one processor, and the bridge circuit is operative to receive the request from the operating system module over at least one of the first and second communication paths and to change the performance state of the at least one processor based on the request.

22. The integrated circuit of claim 20, wherein the at least one processor includes a storage register on the second communication path for storing the request, and the performance state security logic accesses the request over the second communication path from the storage register.

23. The integrated circuit of claim 20, wherein the performance state security logic is further operative to analyze the security condition of the at least one processor by comparing a target performance state identified with the request with a plurality of predefined performance states, and initiate an execution of the request in response to the target performance state matching at least one of the predefined performance states.

24. The integrated circuit of claim 20, wherein the at least one processor further includes performance state control logic and at least one of a voltage regulator and a clock regulator, the performance state security logic is operative to transmit the request to the performance state control logic in response to a determination that the at least one processor is in a secure condition, and the performance state control logic is operative to transmit at least one of a voltage request and a frequency request to the at least one of the voltage regulator and the clock regulator based on the request to change the at least one of the operating voltage and the operating frequency of the at least one processing core.

25. The integrated circuit of claim 20, wherein the performance state security logic is further operative to at least one of deny the execution of and modify the request in response to a determination that the at least one processor is in an unsecure condition, and the performance state security logic modifies the request by modifying at least one of a target operating voltage and a target operating frequency of the at least one processing core identified with the request.

26. The integrated circuit of claim 20, wherein the at least one processor includes memory containing microcode that when executed by the at least one processor is operative to receive the request from an operating system module and to transmit the received request to performance state control logic of the at least one processor for changing the performance state of the at least one processing core, and the performance state security logic intercepts the request by blocking a transmission of the request from the microcode to the performance state control logic.

27. A computing system comprising:
an operating system module operative to transmit a request for a change of a performance state of at least one processing core of the computing system;
performance state control logic in communication with the operating system module and operative to receive the request and to change the performance state of the at least one processing core based on the request; and
performance state security logic operative to intercept the request transmitted from the operating system module to the performance state control logic, analyze a security condition of the at least one processor for an indication of an unauthorized access to the at least one processor, and selectively transmit the request to the performance state control logic based on the security condition of the computing system, the performance state security logic intercepts the request for the change of the performance state by blocking a transmission of the request from going over a first communication path of the at least one processor to a first destination and routing the request over a second communication path of the at least one processor to the first destination, the second communication path being different from the first communication path.

28. The computing system of claim 27, wherein the first and second communication paths are routed from the operating system module to the performance state control logic.

29. The computing system of claim 28, further comprising a storage register on the second communication path operative to store the request from the operating system module, and the performance state security logic accesses the request over the second communication path from the storage register.

30. The computing system of claim 27, wherein the performance state security logic is further operative to
analyze the security condition of the computing system by comparing a target performance state identified with the request with a plurality of predefined performance states, and
transmit the request to the performance state control logic for execution in response to the target performance state matching at least one of the predefined performance states.

31. The computing system of claim 27, further comprising at least one of a voltage regulator and a clock regulator in communication with the performance state control logic, the performance state security logic being operative to transmit the request to the performance state control logic in response to a determination that the computing system is in a secure condition, and the performance state control logic is operative to transmit at least one of a voltage request and a frequency request to the at least one of the voltage regulator and the clock regulator based on the request to change the at least one of the operating voltage and the operating frequency of the at least one processing core.

32. The computing system of claim 27, wherein the performance state security logic is operative to block transmission of the request to the performance state control logic in response to a determination that the computing system is in an unsecure condition.

33. The computing system of claim 27, further comprising memory containing microcode that when executed by the computing system is operative to receive the request from the operating system module and to transmit the request to the performance state control logic for changing the performance state of the at least one processing core, and the performance state security logic intercepts the request by blocking a transmission of the request from the microcode to the performance state control logic.

34. The computing system of claim 27, further comprising a display device operatively coupled to the at least one processing core and configured to display data processed at least in part by the at least one processing core.

* * * * *